United States Patent [19]

Cunningham

[11] Patent Number: 4,666,086

[45] Date of Patent: May 19, 1987

[54] REMOTELY CONTROLLED SPRAY GUN

[75] Inventor: William C. Cunningham, Huntsville, Ala.

[73] Assignee: The United States of America as represented by the Administrator of the National Aeronautics and Space Administration, Washington, D.C.

[21] Appl. No.: 852,466

[22] Filed: Apr. 10, 1986

[51] Int. Cl.⁴ .............................. B05B 7/04; B05B 1/00
[52] U.S. Cl. ..................................... 239/433; 239/596; 239/600
[58] Field of Search ............... 239/596, 600, 590, 591, 239/397, 398, 433; 285/24, 27; 901/43

[56] References Cited

U.S. PATENT DOCUMENTS

| | | | |
|---|---|---|---|
| 3,447,755 | 6/1969 | Cartwright | 239/600 X |
| 4,108,379 | 8/1978 | Talley | 239/600 X |
| 4,128,206 | 12/1978 | Birtner | 239/590 X |
| 4,427,153 | 1/1984 | Schaefer | 239/600 X |
| 4,545,157 | 10/1985 | Saurwein | 239/433 X |
| 4,588,131 | 5/1986 | Yamamoto et al. | 239/596 X |

Primary Examiner—Andres Kashnikow
Assistant Examiner—Mary Beth O. Jones
Attorney, Agent, or Firm—Joseph H. Beumer; John R. Manning; Leon D. Wofford, Jr.

[57] ABSTRACT

A remotely controlled spray gun in which a nozzle 42 and orifice plate 40 are held in precise axial alignment by alignment member 54, in turn held in alignment with the general outlet 33 of the spray gun by insert 36. By this arrangement, precise repeatability of spray patterns is insured.

7 Claims, 3 Drawing Figures

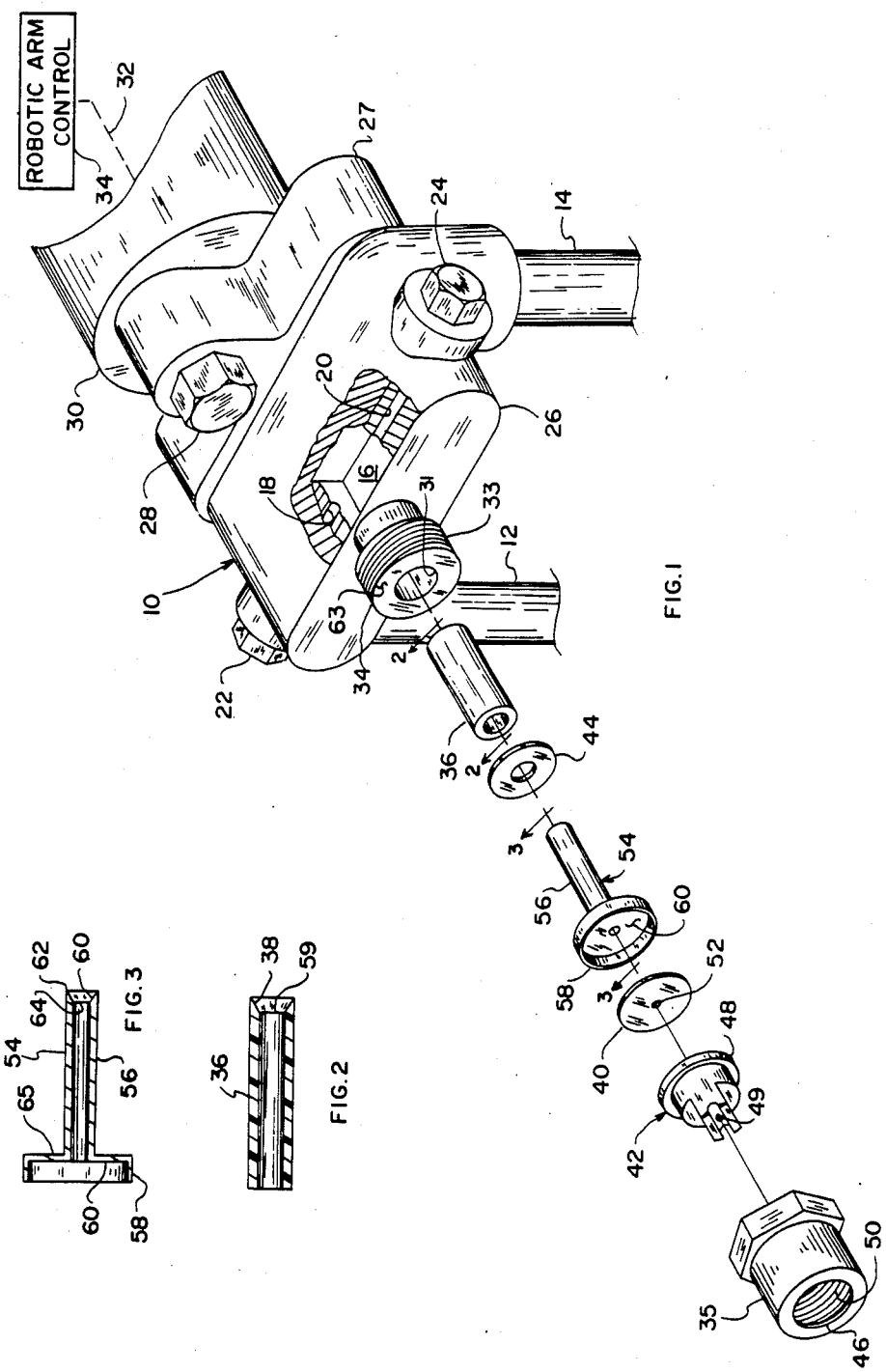

REMOTELY CONTROLLED SPRAY GUN

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to devices for spraying fluid materials and particularly to portable devices such as spray guns which are directable by robotic control for precise automated spraying.

BACKGROUND OF THE INVENTION

Certain spray guns or sprayers, including Models 43P and 43PA manufactured by Binks Manufacturing Company of Chicago, Ill., are adapted to spray low viscosity materials and include means for internally mixing components of material to be sprayed. The listed ones are of the airless, or hydaulically atomization, type, the Model 43P being a hand-held model, and the Model 43PA being adapted to be machine held as by a robotic arm. The latter model is particularly useful when it is desired to not only effect automatic positioning of the gun, but also where precise control over a spray pattern is particularly desirable or necessary. For example, the Model 43PA has been used to spray polyurethane or polyisocyanurate foam on both the inside and outside of the cylindrical cover which houses fuel and oxygen tanks of certain space vehicles. When spraying the outside of the cover, it is obvious that the coating must be even in order to provide an aerodynamically smooth surface. There are, of course, other, less exotic, instances where precision spraying is important.

For some time, difficulty has been experienced in achieving uniformity with conventional equipment. Accordingly, it is an object of this invention to provide an improved fluid control structure for a spray gun which will overcome the problem of variations in spray pattern presently experienced.

SUMMARY OF THE INVENTION

In accordance with this invention, the elements controlling the fluid path from a mixing chamber of a sprayer, namely an orifice plate and a nozzle which are normally radially positioned by a threaded collar, are positioned by an alignment member which directly holds, in axial alignment, the orifice plate and nozzle of the sprayer. The alignment member is, in turn, held in coaxial alignment with an exit of the mixing chamber by the collar which need only apply an axial force to maintain a constant fluid path and spray pattern.

BRIEF DESCRIPTION OF THE DRAWING

FIG. 1 is a perspective view of an embodiment of the invention, partly in exploded form.

FIG. 2 is a sectional view taken along line 2—2 of FIG. 1.

FIG. 3 is a sectional view taken along line 3—3 of FIG. 1.

DESCRIPTION OF THE PREFERRED EMBODIMENT

Referring to the drawing, the numeral 10 generally designates the body of a hydraulic atomization spray gun. It conventionally includes inlets 12 and 14 through which are fed components of a fluid mixture, which mixture is effected in mixing chamber 16. Each fluid component is fed through a valve (not shown) which meters a component through one of metering tubes 18 and 20. The metering valves include adjustably positioned orifices (not shown) installable and removable via installation nuts 22 and 24. The forward portion of the body is generally shaped as shown. The outer case includes a forward, generally oblong region 26 and rear region 27 which extends above the front region. It also includes a mounting bolt 28 adapted to secure the sprayer to a grippable member, for example, a hand-gripping member or, as shown, a cylinder 30 which may be gripped by a mechanical or robotic arm, diagrammatically illustrated by dashed line 32 connected to a conventional robotic arm control 34. Thus, body 10 of the sprayer is remotely controllable to direct a spray pattern over a particularly configured object.

By means of the conventional structure thus far described, a fluid mixture, such as forming polyurethane, or polyisocyanurate foam, is supplied from mixing chamber 16 outward through an opening 31 of annular outlet 33. Annular outlet 33 has an exterior threaded region 34 adapted to enable the mounting of particular nozzle-orifice assemblies by collar nut 35.

As stated above, the present invention specifically encompasses a nozzle-orifice assembly, and it is illustrated by the exploded portion of the drawing.

First, a cylindrical insert 36 made of Teflon TM, or other plastic material adapted to have little affinity for the mixture employed, would have an exterior diameter of approximately the diameter of opening 31 of annular outlet 33 and would be precisely dimensioned to effect a frictional fit within opening 31. Typically, the outer diameter of insert 36 would be from 0.277 to 0.280 inch and its inner diameter would be from 0.200 to 0.205 inch. Typically, insert 36 would be on the order of 0.815 plus or minus 0.020 inch long, and it has a tapered end region 38, being tapered toward the spray body wherein the inner and outer diameters merge as shown in FIG. 2.

Normally, and in accordance with the prior art, the fluid oulet of annular outlet 33 would be directly fed to an orifice plate 40 which meters flow to a nozzle 42, the nozzle being particularly configured to effect a selected pattern of spray as, for example, a fan-shaped pattern. A gasket 44 is placed between orifice plate 40 and annular outlet 33, and the two are compressed together in final assembly by collar nut 35. Collar nut 35 has an inwardly extending flange 46 which fits around an annular extension 48 of nozzle 42 and then, via its internal threads 50, threads over and to annular outlet 33. Nozzle nut 35, nozzle 42, and orifice plate 40 are standard items and are generally mass produced. The nozzle and orifice plates must be removable from their encasement by nozzle nut 35 and as the latter has an internal thread 50, it is generally difficult to effect a close radial tolerance, or fit, between the nozzle nut and the nozzle. Worse, it is practically impossible to effect a like confinement by nozzle nut 35 of orifice plate 40, and thus it is literally impossible to maintain coaxial alignment between opening 52 of orifice plate 40 and passageway 49 of nozzle 42, which, conventionally, finally determines a spray pattern. As a result, it has been found that the variable positioning of these members prevents prediction of the precise spray pattern which one can expect. This in turn prevents accurate control of spraying by automated or robotic means.

In accordance with this invention, the foregoing problem is solved by eliminating radial control of the nozzle and orifice plate by nozzle nut 35. This is accomplished by the addition of alignment member 54. It is configured with an elongated cylindrical section 56 which is dimensioned to have an external diameter such that it makes a frictional fit with the interior of insert 36 and its length is such that it extends into insert 36 up to the edge 59 of tapered end region 38. Elongated cylindrical section 54 also has an interior taper 60 extending inward from thin inlet edge at point 62 down to the general interior diameter as shown in the region to the left of point 64, which diameter is typically slightly larger than opening 52 of orifice plate 40. The outlet end of alignment member 54 is enlarged as shown and flange 58 provides a circular periphery for a recess 60, recess 60 having an inner diameter closely following the diameter of orifice plate 40, which is positioned to closely fit within recess 60. The depth of recess 60 is slightly greater than the thickness of orifice plate 40 and provides a radial restraint for nozzle 42 which is of the same diameter as orifice plate 40.

As assembled, nut 35 is threaded on annular outlet 33. Insert 36 is thereby pressed into opening 31 of annular outlet 33, and alignment member 54 is pressed in insert 36 to a point where tapered region 38 of inserts 36 and 60 of alignment member 54 abut or essentially abut to effect a continuous, or approximately continuous, taper. Gasket 44 is compressed and seals between the face 63 of annular outlet 33 and interface 65 of alignment member 54. Thus, alignment member 54 is secured in a fixed coaxial position with respect to opening 31 of spray gun 10. Orifice plate 40 and nozzle 42 are precisely radially confined by recess 60, flange 46 applying an axial force to annular extension 48 of nozzle 42 and therefrom applying an axial force to orifice plate 40, alignment member 54, and gasket 44 to annular outlet 33. By virtue of this construction, nozzle 42 and orifice plate 40 are maintained in a specific alignment and a precise and predictable spray pattern may be achieved by spray gun 10.

I claim:

1. A hydraulic atomization spray gun comprising:
   a body member;
   a mixing chamber within said body and first and second inlet means for supplying first and second fluids to said mixing chamber;
   a cylindrical insert rigidly positionable in said body and positioned to receive fluid from said mixing chamber and having an axial passageway through which fluid passes from end to end of said insert;
   an annular member having an axial opening therethrough and comprising an elongated cylindrical region forming a central body of said annular member and extending to, and forming one end region of, said annular member, the outer diameter of said last-named end region being dimensioned to frictionally fit within and be held by said cylindrical insert, and an opposite end region of said annular member being of an enlarged diameter and including a circular recess and flange extending around said recess;
   a circular orifice plate having a central opening, said orifice plate having an outer diameter closely following the diameter of said recess and positionable in said recess, said orifice plate being of a thickness less than the depth of said recess and being closely radially secured by said flange;
   a circular nozzle having an axial opening therethrough and having an outer diameter region dimensioned to closely fit within said recess and said flange and thereby said last-named opening is held in alignment with said opening of said orifice plate; and
   an annular collar having an inner dimension generally coinciding with the outer dimension of said flange and positionable over said nozzle, said orifice plate, said annular member, and said insert, and said collar including means for concentrically securing said collar to said body and applying an axial force to said nozzle, said orifice plate and said annular member for securing said nozzle and orifice plate in said recess.

2. A hydraulic atomization spray gun as set forth in claim 1 wherein:
   said body member includes a cylindrical opening communicating with said mixing chamber; and
   said cylindrical insert is of a yieldable plastic material and frictionally positionable within said cylindrical opening of said body member.

3. A hydraulic atomization spray gun as set forth in claim 2 wherein an end region of said axial passageway of said cylindrical insert is tapered between its inner diameter and its outer diameter, and said last-named end region is positioned as a fluid entrance end region of said insert and supplied fluid by said mixing chamber.

4. A hydraulic atomization spray gun as set forth in claim 3 wherein an end of said end region of said elongated cylindrical region of said annular member is tapered from its inner diameter to its outer diameter, whereby there is a generally smooth fluid transition path from said mixing chamber through said insert and said annular member to said orifice plate.

5. A hydraulic atomization spray gun as set forth in claim 4 wherein:
   said body member includes a generally annular protrusion having a threaded outer region and includes said cylindrical opening adapted to communicate with said mixing chamber and to receive said insert, and said annular collar having a threaded interior configured to thread onto said threaded end region of said protrusion; and
   an annular gasket positioned around said elongated cylindrical region of said annular member and compressed by said annular collar between said annular protrusion and said opposite end region of said annular member.

6. A hydraulic atomization spray gun as set forth in claim 1 wherein said body member includes a grippable region and gripping means for gripping said grippable region and control means for orienting said grippable region through said gripping means.

7. A hydraulic atomization spray gun as set forth in claim 5 wherein said body member includes a grippable region and gripping means for gripping said grippable region and control means for orienting said grippable region through said gripping means.

* * * * *